(12) United States Patent
Schmidt et al.

(10) Patent No.: US 6,931,449 B2
(45) Date of Patent: Aug. 16, 2005

(54) METHOD MIGRATING OPEN NETWORK CONNECTIONS

(75) Inventors: Brian K. Schmidt, Mountain View, CA (US); James G. Hanko, Redwood City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 641 days.

(21) Appl. No.: 09/816,996

(22) Filed: Mar. 22, 2001

(65) Prior Publication Data
US 2002/0138629 A1 Sep. 26, 2002

(51) Int. Cl.[7] .................... G06F 15/177; G06F 15/16
(52) U.S. Cl. ................ 709/228; 709/220; 709/221; 709/248
(58) Field of Search .................. 709/220, 221, 709/228, 248

(56) References Cited

U.S. PATENT DOCUMENTS

| | | | | |
|---|---|---|---|---|
| 5,825,649 A | * | 10/1998 | Yoshimura | 700/82 |
| 5,938,722 A | | 8/1999 | Johnson | |
| 6,151,590 A | * | 11/2000 | Cordery et al. | 705/60 |
| 6,587,874 B1 | * | 7/2003 | Golla et al. | 709/220 |
| 2002/0085549 A1 | * | 7/2002 | Reza et al. | 370/389 |
| 2003/0172080 A1 | * | 9/2003 | Talanis et al. | 707/100 |

FOREIGN PATENT DOCUMENTS

WO    WO 200122743 A2 *    3/2001    ........... H04L/12/56

OTHER PUBLICATIONS

"Technical White Paper" VMware, Inc., Feb. 1999, pp. 1–7 (XP–002241055).

"Nomadic Computing Environment Employing Wired and Wireless Networks" By Toshiaki Tanaka, Masahiro Morikura and Hitoshi Takanashi, IEICE Trans. Commun., vol. E81–B No. 8, Aug. 8, 1998, pp. 1565–1573 (XP–000788462).

* cited by examiner

*Primary Examiner*—Jeffrey Gaffin
*Assistant Examiner*—Angel L. Casiano
(74) *Attorney, Agent, or Firm*—Martine, Penilla & Gencarella, LLP

(57) ABSTRACT

A mechanism for the migration of open network connections is described herein. According to one or more embodiments of the present invention, an active computing environment called compute capsule is provided. Each capsule has a unique locator. Packets are used to send information between capsules using the locators. When a capsule migrates, any open network connections that existed before the migration may continue when the capsule finishes the migration.

16 Claims, 11 Drawing Sheets

METHOD MIGRATING OPEN NETWORK CONNECTIONS

BACKGROUND OF THE INVENTION

1. Field of the Invention

The present invention relates primarily to the field of computer networks, and in particular to migrating open network connections.

2. Background Art

Sometimes a person's interaction with a computer involves using one or more computer programs (applications) that initiate connections to other computers over a computer network (open network connections). Sometimes it is desirable for this person to stop the interaction with the computer, to move to a new computer, and to begin interacting with the new computer at precisely the point where the user stopped interacting with the first computer. Using current schemes, however, this is not possible because the user's computing environment cannot be represented in a form that can be understood by both computers and moved between these computers.

However, in co-pending U.S. patent application entitled "Method and Apparatus for Representing and Encapsulating Active Computing Environments" Application No. 09/764,771 filed on Jan. 16, 2001, assigned to the assignee of the present application, and hereby fully incorporated into the present application by reference, it was described how a group of active processes and their associated state could be represented in a form that made it possible to halt the active processes, to move them to a different binary compatible machine, or to suspend them on disk for later revival on the same or a different machine.

Still, however, it is not possible to move active computing environments and still maintain the open network connections. Before further discussing the drawbacks of current schemes, it is instructive to discuss how the nature of computing is changing.

The Nature of Computing

The nature of computing is changing. Until recently, modern computing was mostly "machine-centric", where a user accessed a dedicated computer at a single location. The dedicated computer had all the data and computer programs necessary for the user to operate the computer, and ideally, it had large amounts of hardware, such as disk drives, memory, processors, and the like. With the advent of computer networks, however, different computers have become more desirable and the focus of computing has become "service-oriented". In particular, computer networks allow a user to access data and computer programs that exist elsewhere in the network. When the user accesses such data or computer programs, the remote computer is said to be providing a service to the user. With the improvement in services available to users, the need to have a dedicated computer following the machine-centric paradigm is greatly reduced. The machine-centric paradigm also becomes much less practical in this environment because distributing services is much more cost-effective.

In particular, computers in a service-oriented environment have little need for powerful hardware. For instance, the remote computer processes the instructions before providing the service, so a powerful processor is not needed on the local access hardware. Similarly, since the service is providing the data, there is little need to have large capacity disk drives on the local access hardware. In such an environment, one advantage is that computer systems have been implemented that allow a user to access any computer in the system and still use the computer in the same manner (i.e., have access to the same data and computer programs).

For instance, a user may be in location A and running a word processor, a web browser, and an interactive multimedia simulation. In a service-oriented environment, the user might stop using the server computer in location A and move to location B where the user could resume these computer programs on a different machine at the exact point where the user stopped using the machine at location A, as long as both computers had access via the computer network to the servers where the programs were being executed. The running programs themselves in this example, however, cannot be moved between computers because of the design of current operating systems.

Migration

Moving (or migrating) the programs between servers is desirable, for instance, when the remote computer performing the data processing and running the computer programs becomes busy or is off-line for repair or upgrades. In other instances it is desirable for a user to suspend the programs as they are in progress, for instance, using a disk, and to resume the programs later on a different machine. Often some of the processes to be suspended or moved may have open network connections. If the user is using a database program, it may be connected to a remote server where the database resides, for example. Currently when the user migrates to another machine, this connection is lost and has to be re-established.

One scheme leaves behind routers to act as forwarding agents for the new machine. These agents add to the overhead cost of the network, and slows down the communications process if there are many of them in the network. Furthermore, leaving behind forwarding agents also means that the user's session may not operate properly if any of the computers holding a forwarding agent for the session fails. Leaving behind forwarding agents increases the dependency of the computing environment on remote machines, which is an unbounded problem.

One problem with current packet based schemes to route information across a network is that the packets of information sent back and forth between machines have some information that is unique to each machine. In particular, each packet contains two parts, the header and the payload. The header contains routing information and the payload contains the actual data. Part of the routing information is the Internet Protocol address (IP address) of the machine on which the process is running. When the user migrates to another machine the IP address changes. Not only are all packets received prior to the migration lost, but any packets remaining in the transfer will not reach the user who has migrated to another machine because the IP address of that machine is different. All packets sent to and from this new machine will now have a different IP address as part of the header section.

SUMMARY OF THE INVENTION

The present invention is directed to a method and apparatus for transparent migration of open network connections. According to one or more embodiments of the present invention a compute capsule is provided. The capsule has a unique locator, such as an IP address, assigned to it. Using the unique locator, the capsule may be moved to a different machine having potentially a different operating system or on different network and maintain the open network connections it had prior to the migration.

All users are assigned their own capsule at the time of log in, i.e. session creation. The capsule communicates with other capsules in the form of packets. In one embodiment, the outgoing packet uses the unique locator (i.e., IP address) of the target capsule as the final destination. This target capsule may lie on the same host network or on a different one. The underlying system knows the location of the target capsule by looking at the locator (e.g., IP address) of the target capsule, which may be encapsulated as part of the header information of the outgoing packet. In another embodiment, the underlying system wraps the original packet in another packet that uses the IP address of the host network on which the target capsule currently lies as the final destination instead of the locator of the target capsule. This new packet is routed using the standard network infrastructure to the host network on which the target capsule lies.

In another embodiment, the present invention allows the host network on which the target capsule currently lies to remove the wrapper around the outgoing packet, and deliver it to the rightful owner (target capsule). In this way all applications address incoming packets by their network address regardless of the location of the target capsule. The target capsules are then mapped to the respective machine hosts using, for example, naming services like Lightweight Directory Access Protocol (LDAP) or others.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

Embodiments of the present invention are directed to the migration of open network connections. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

To migrate open network connections a compute capsule structure is implemented. All of the state and data related to the open network connections of the member processes in the compute capsule forms a portion of the compute capsule. When the capsule is moved, the state and data relating to these open network connections allows the connection to resume.

Compute Capsules

A compute capsule comprises one or more processes and their associated system environment. A compute capsule is configured to provide an encapsulated form that is capable of being moved between computers or stored off-line, for instance on a disk drive or other non-volatile storage medium. The system environment in a capsule comprises state information relating to exactly what the processes are doing at any given time in a form that is understandable by any binary compatible machine. System environment information may include, for instance, privileges, configuration settings, working directories and files, assigned resources, open devices, installed software, and internal program state.

Processes in the same capsule may communicate with each other and share data via standard Interprocess Communication (IPC) mechanisms, for instance using pipes, shared memory, or signals. Communication with processes outside the capsule, on the other hand, is restricted to Internet sockets and globally shared files. This ensures that capsules can move without restriction. For example, a conventional IPC pipe between processes in different capsules would force both capsules to reside on the same machine, but a socket can be redirected. The use of compute capsules is completely transparent, and applications need not take any special measures, such as source code modification, re-compilation, or linking with special libraries. In addition, a system using compute capsules can seamlessly inter-operate with systems that do not.

Re-Partitioning the Operation System

Figure 1:
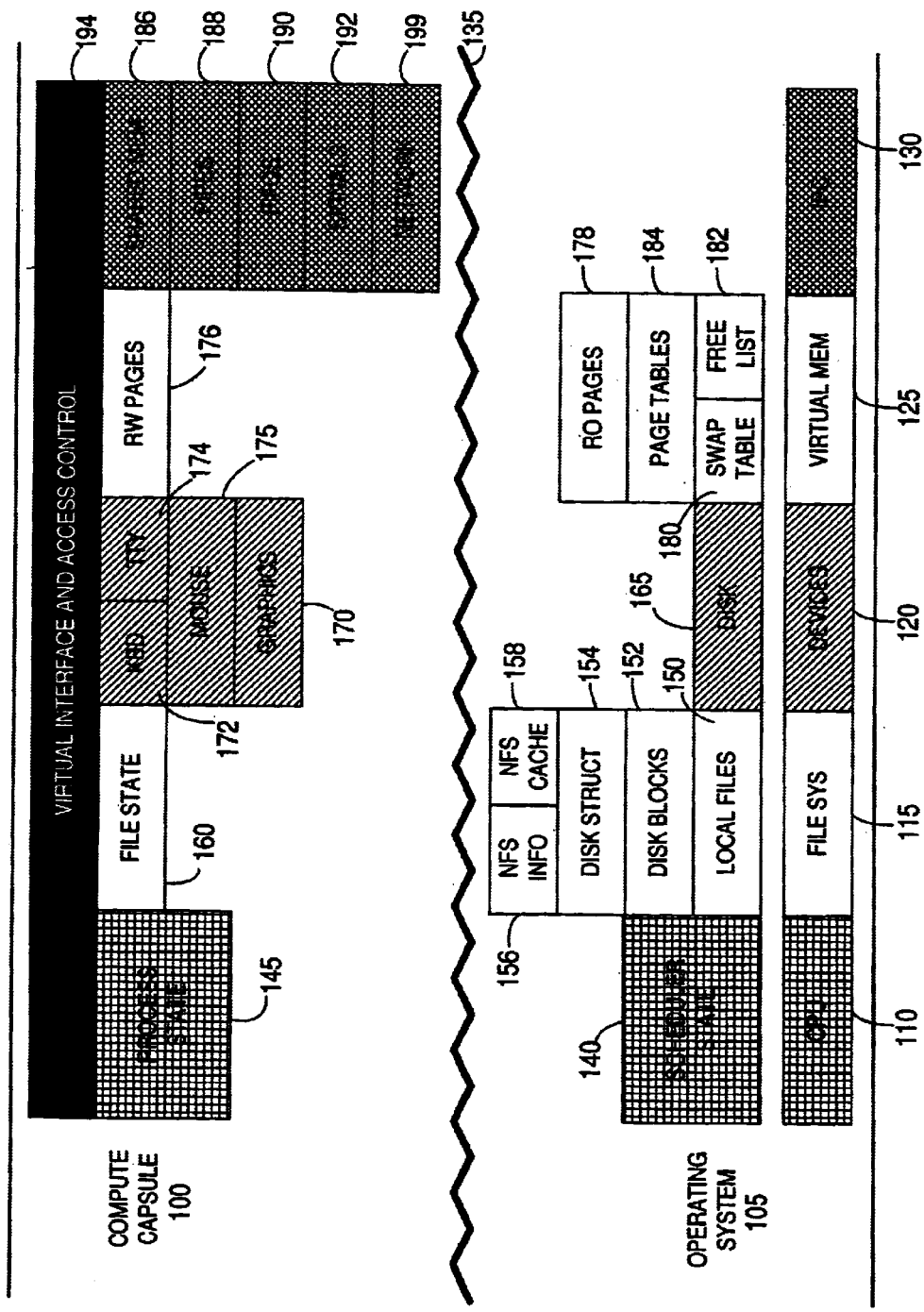
FIG. 1 shows how the traditional operating system is re-partitioned according to one embodiment of the present invention.

To provide such functionality, the traditional operating system is re-partitioned as shown in FIG. 1 so that all host-dependant and personalized elements of the computing environment are moved into the capsule 100, while leveraging policies and management of the shared underlying system 105. The computing environment comprises CPU 110, file system 115, devices 120, vita memory 125, and IPC 130. Each of these components of the computing environment have been partitioned as indicated by the curved line 135.

The state of the CPU scheduler 140 is left in the operating system 105. This state comprises information that the operating system maintains so that it knows which processes may run, where they are, what priority they have, how much time they will be granted processor attention, etc. Process state 145, which is moved to the compute capsule 100, has process-specific information, such as the values in the registers, the signal handlers registered, parent/child relationships, access rights, and file tables. The file system 115 leaves local files 150 that are identically available on all machines, (e.g., /usr/bin or/man on a UNIX system) in the operating system 105. The file system 115 further leaves disk blocks 152 outside the capsule, which are caches of disk blocks that are read into the system and can be later used when needed to be read again. The disk structure 154 is also left outside the capsule. The disk structure is specific to an operating system and serves as a cache of where files are located on the disk, (i.e., a mapping of pathnames to file locations). Network file system (NFS) is a protocol for accessing files on remote systems. The operating system maintains information 156 with respect to the NFS and a cache 158, which is a cache of files the operating system has retrieved from remote servers and stored locally. Similar state is maintained for other network based file systems.

What has been partitioned away from the operating system is the file state 160. The file state 160 is moved to the capsule 100. The file state 160 is the state of a file that some process in the capsule has opened. File state 160 includes, for instance, the name of the file and where the process is currently accessing the file. If the file is not globally accessible via the network (e.g., stored on a local disk), then its contents are placed in the capsule.

Devices 120 are components that are attached to the computer. For each device there is a driver that maintains the state of the device. The disk state 165 remains in the operating system 105. The other device components are specific to a log-in session and are moved to the capsule 100. The other devices include a graphics controller state 170, which is the content that is being displayed on the screen, for instance the contents of a frame buffer that holds color values for each pixel on a display device, such as a monitor.

Keyboard state 172 and mouse state 175 includes the state associated with the user's current interaction with the keyboard, for instance whether caps lock is on or off and with the screen, for instance where the pointer is currently located. Tty state 174 includes information associated with the terminals the user is accessing, for instance if a user opens an Xwindow on a UNIX system or if a user uses telnet or performs an rlogin (remote login). Tty state 174 also includes information about what the cursor looks like, what types of fonts are displayed in the terminals, and what filters should be applied to make the text appear a certain way, for instance.

Virtual memory 125 has state associated with it. The capsule tracks the state associated with changes made from within the capsule which are termed read/write pages 176. Read-only pages 178 remain outside the capsule. However, in one embodiment read-only pages 178 are moved to the capsule as well, which is useful in some scenarios. For instance, certain commands one would expect to find on a new machine when their capsule migrates there may not be available. Take, for instance, a command such as ls or more on a UNIX system. Those read-only pages may not be necessary to bring into the capsule when it is migrating between UNIX machines, because those pages exist on every UNIX machine. If, however, a user is moving to a machine that does not use those commands, it is useful to move those read only pages into the capsule as well. The swap table 180, which records what virtual memory pages have been replaced and moved to disk, remains outside the capsule as do the free list 182, (which is a list of empty virtual memory pages), and the page table 184.

All IPC 130 is moved into the capsule. This includes shared memory 186, which comprises a portion of memory that multiple processes maybe using, pipes 188, fifos 190, signals 192, including handler lists and the state needed to know what handler the process was using and to find the handler. Virtual interface and access control 194 is useful for separating the capsule from host-dependent information that is specific to a machine, such as the structure of internal program state or the IDs for its resources. The interface 194 refers generally to the virtualized naming of resources and translations between virtual resource names and physical resources, as well as lists that control access to processes trying to access capsules. Virtualization facilitates the remapping of resource names to a new computer when a process is migrated. Network portion 199 comprises the information necessary for data to be transferred across a network. For instance, it includes the location of the source of a packet and the location of the destination for a packet.

Thus, capsule state includes data that are host-specific, cached on the local machine to which the capsule is bound, or not otherwise globally accessible. This includes the following information:

Capsule State: Name translation tables, access control list, owner ID, capsule name, etc.;

Processes: Tree structure, process control block, machine context, thread contexts, scheduling parameters, etc.;

Address Space Contents: Read/write pages of virtual memory; because they are available in the file system, contents of read-only files mapped into the address space (e.g., the application binary and libraries) are not included unless explicitly requested;

Open File State: Only file names, permissions, offsets, etc. are required for objects available in the global file system. However, the contents of personal files in local storage (e.g., /tmp) must be included. Because the pathname of a file is discarded after it is opened, for each process one embodiment of the invention maintains a hash table that maps file descriptors to their corresponding pathnames. In addition, some open files have no pathname, (i.e., if an unlink operation has been performed). The contents of such files are included in the capsule as well;

IPC Channels: IPC state has been problematic in most prior systems. The present invention adds a new interface to the kernel modules for each form of IPC. This interface includes two complementary elements: export current state, and import state to re-create channel. For example, the pipe/fifo module is modified to export the list of processes attached to a pipe, its current mode, the list of filter modules it employs, file system mount points, and in-flight data. When given this state data, the system can re-establish an identical pipe;

Open Devices: By adding a state import/export interface similar to that used for IPC, the invention supports the most commonly used devices: keyboard, mouse, graphics controller, and pseudo-terminals. The mouse and keyboard have very little state, mostly the location of the cursor and the state of the LEDs (e.g., caps lock). The graphics controller is more complex. The video mode (e.g., resolution and refresh rate) and the contents of the frame buffer must be recorded, along with any color tables or other specialized hardware settings. Supporting migration between machines with different graphics controllers is troublesome, but a standard remote display interface can address that issue. Pseudo-terminal state includes the controlling process, control settings, a list of streams modules that have been pushed onto it, and any unprocessed data.

Capsules do not include shared resources or the state necessary to manage them (e.g., the processor scheduler, page tables), state for kernel optimizations (e.g., disk caches), local file system, physical resources (e.g., the network), etc.

Network Layer

Figure 2A:
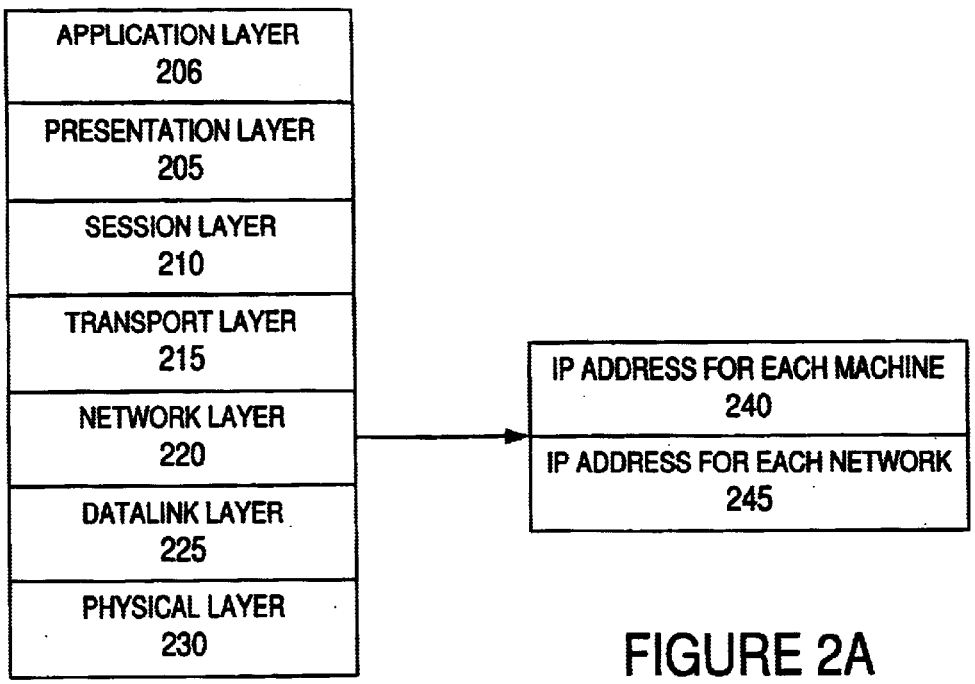
FIG. 2A shows the protocol stack layer for a typical system that uses the International Standards Organization (ISO) model.
Figure 2B:
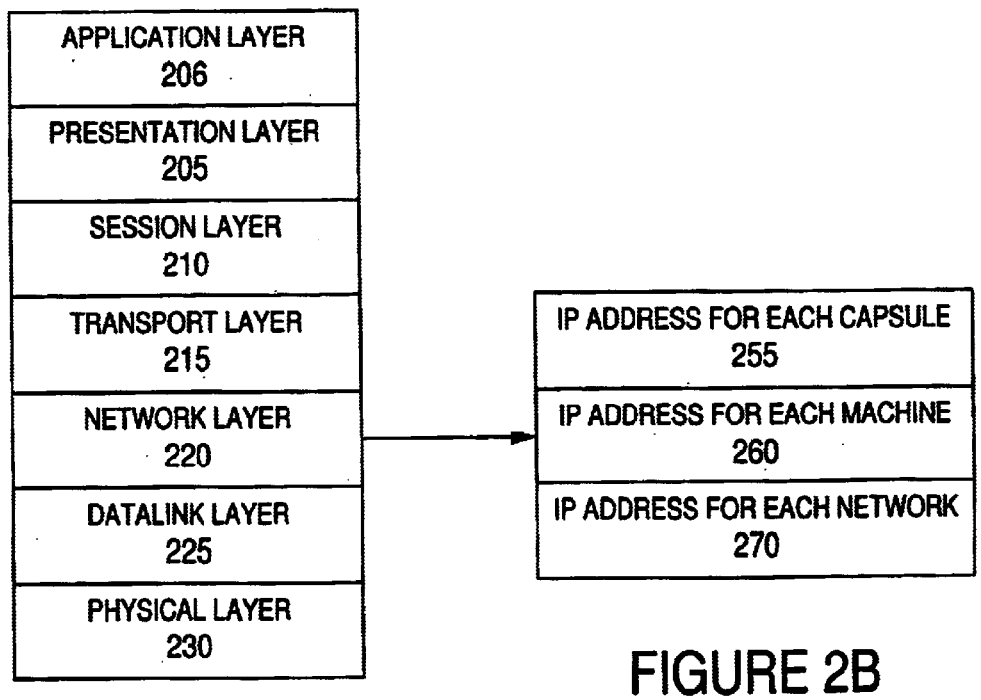
FIG. 2B shows the protocol stack layer for a system according to an embodiment of the present invention.

Network layer 199 of FIG. 1 is further described in FIGS. 2A and 2B. FIG. 2A shows the protocol stack layer for a typical system that uses the International Standards Organization (ISO) model (i.e., the Internet). This networking model includes an application layer 206, a presentation layer 205, a session layer 210, a transport layer 215, a network layer 220, a datalink layer 225, and a physical layer 230. Network layer 220 in this environment assigns every machine a unique locator address 240, commonly known as IP (Internet Protocol) address. It also assigns the network to which these machines are connected a unique network address 245, commonly known as network IP address. These unique address are used to send and receive messages, as well as find the location of any machine on any network. Messages can include email messages, transfer of different kinds of data, etc.

FIG. 2B when contrasted with FIG. 2A illustrates the difference between the current art in system design and a modification to the Protocol stack layer of the ISO model that the present invention uses. FIG. 2B includes the same seven layer approach, but modifies network layer 250 where not only are unique locator addresses for machines 255 and networks 260 assigned, but also every compute capsule in the network is assigned a unique locator address 270.

Capsule Creation

Figure 3:
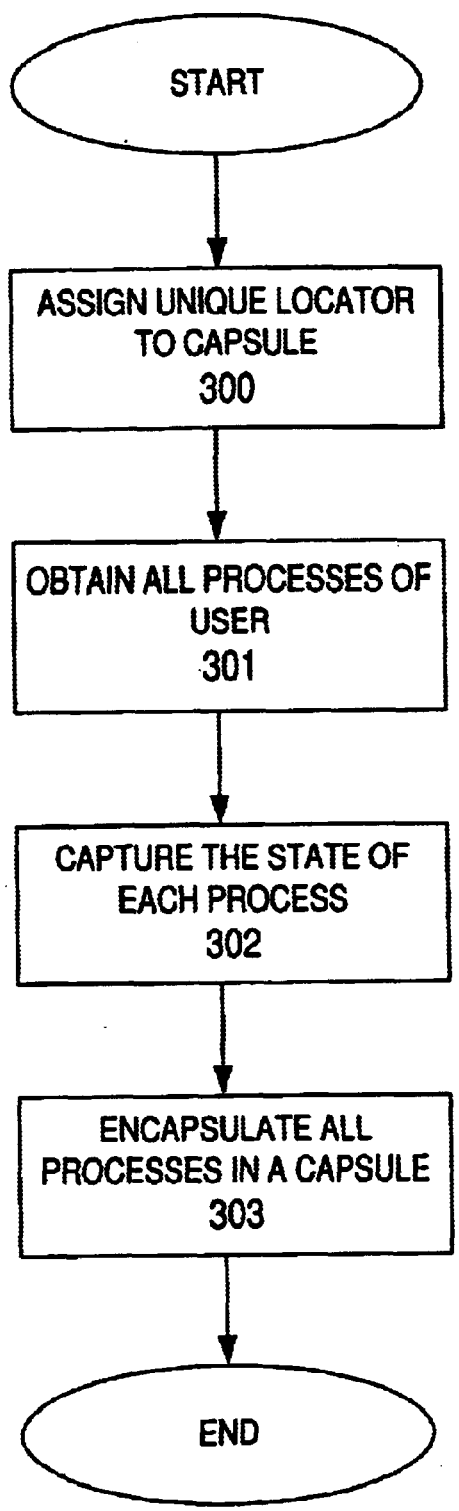
FIG. 3 shows the creation of a compute capsule which is capable of migrating open network connections transparently according to one embodiment of the present invention.

FIG. 3 shows the creation of a compute capsule which is capable of migrating open network connections transparently according to one embodiment of the present invention. At step 300 a unique locator, such as an IP address and a unique network locator address, is given to the capsule. At step 301, all the processes of the user are obtained. Next, at step 302, the state of each process is captured. For example, if a user is transferring data from an open network connection, the state of this process will include the number of packets of data transferred until the point where the user decides to migrate. Step 303 encapsulates all of the processes of the user along with identification information about the user (e.g. log-in session) into a capsule. The user can now migrate to another machine on the same or different network, and the processes that were open before the migration will now be open displaying the same information on the new machine. This smooth transition between machines is possible due to the process states captured and stored in the capsule before the migration.

Figure 4:
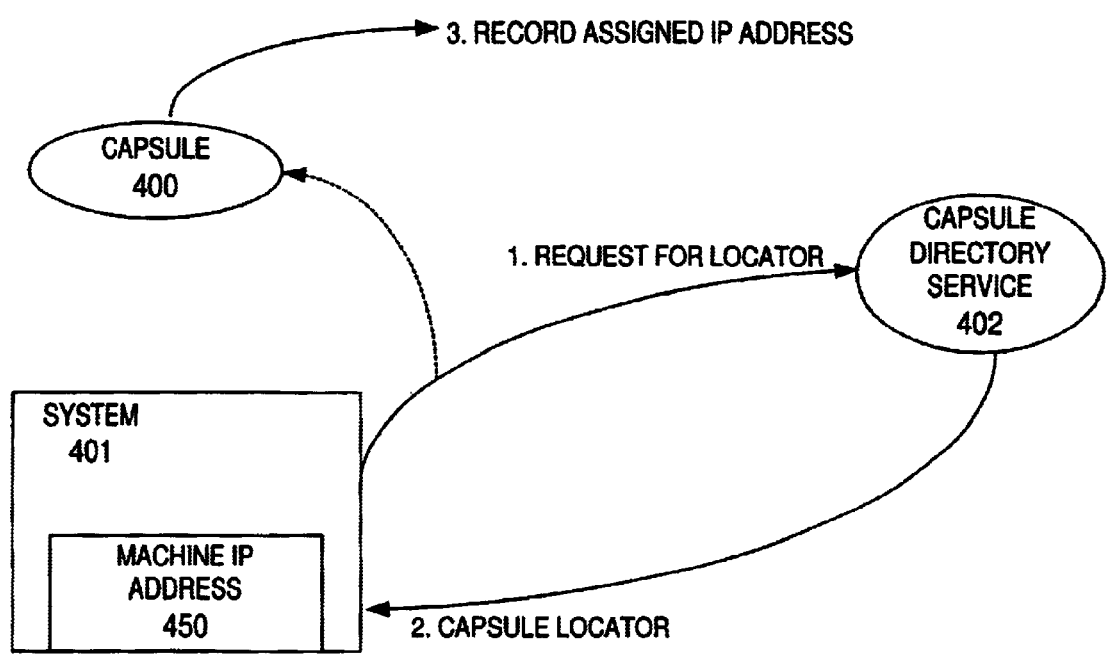
FIG. 4 shows another embodiment of the present invention where capsules receive a unique locator.

FIG. 4 shows another embodiment of the present invention where capsules receive a unique locator. In this embodiment, unique locator, such as an IP address and unique network locator address, is assigned to a capsule. Capsule 400 is created in system 401, which has its own unique network locator address (machine IP address) 450. System 401 requests a unique locator for capsule 400 from a capsule directory service 402. Directory service may be a lightweight directory access protocol (LDAP) service or another well-known service, and it may use Dynamic Host Configuration Protocol (DHCP) although it is not required. Capsule directory service 402 may send back the locator for capsule 400 and also keep track of its location.

Preparation for Migration

Figure 5A:
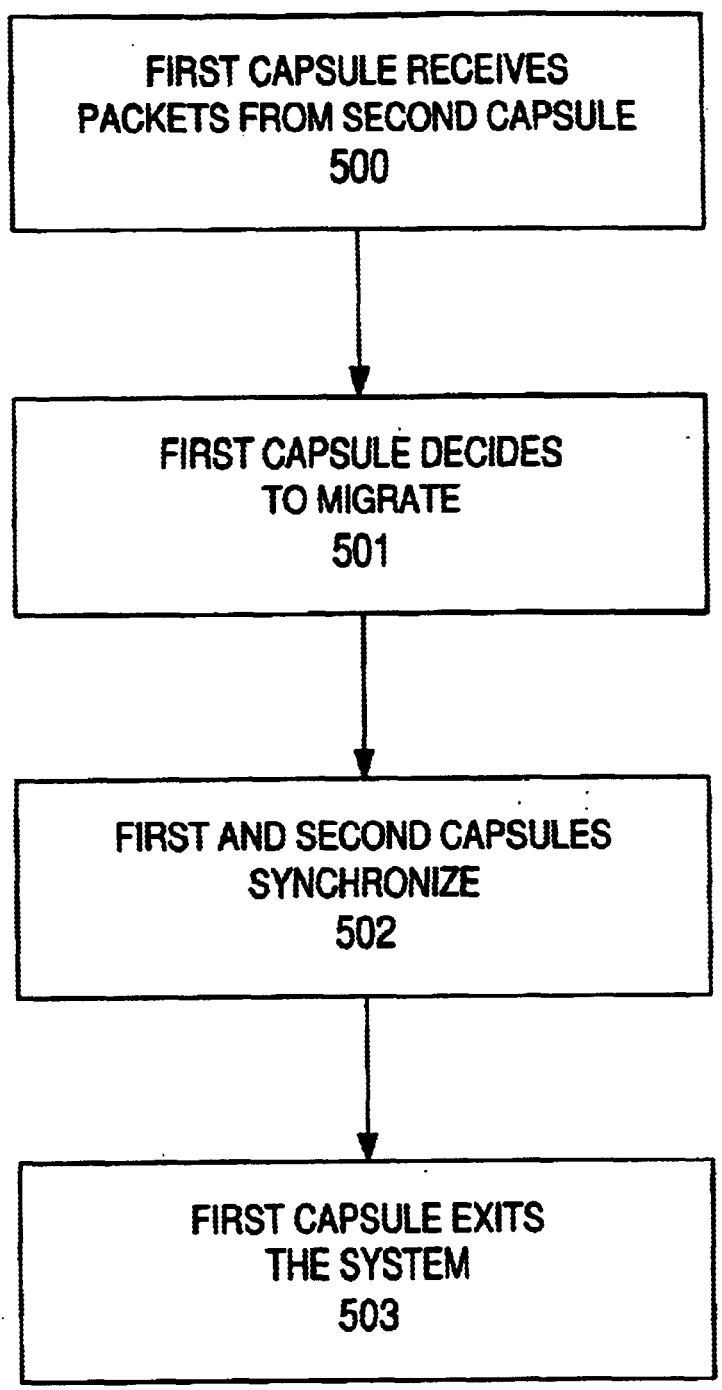
FIG. 5A shows the steps a capsule takes just prior to migration according to an embodiment of the present invention.

One embodiment of the present invention seen in FIG. 5A shows the steps taken just before the migration of an open network connection is initiated, for instance when the system identifies that the user is suspending the session in preparation for migration. This example is shown with respect to a single open network connection, but it should be realized that in most situations any given capsule might have multiple member processes with one or more open network connections in each process. In the case of multiple connections, each is handled in a way described below. In the simplified scenario of FIG. 5, a first capsule is receiving packets from a second capsule, at step 500. At step 501 the first capsule decides to migrate. At step 502, the first and second capsules synchronize with each other.

Synchronizing step 502 may be performed at the kernel level where the two host networks exchange messages. These messages might include the number and kind of packets already exchanged between the two capsules, the port number of the first and second capsules, among other things. The two host networks also agree on the state of the capsules just before the first capsule migrates. The capsules as well as processes are not only unaware of this synchronization step, but are unaware of the migration of the first capsule. Since a capsule often has multiple open network connections with more than one capsule, synchronization step 502 has to be performed individually with each capsule. At step 503, the first capsule exits the system, for instance to migrate and join back later when the user logs back in at a later time on a different machine.

Figure 5B:
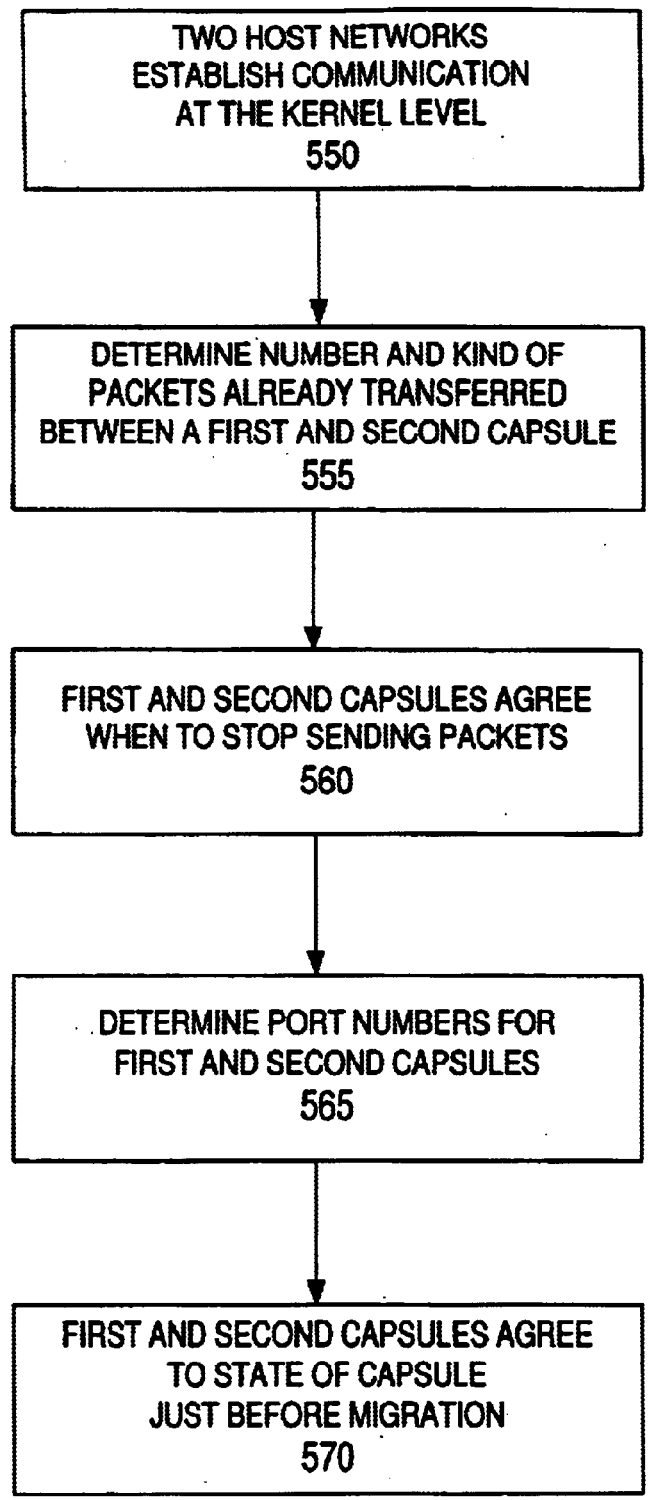
FIG. 5B shows the synchronization between capsules according to an embodiment of the present invention.

One embodiment of the synchronization steps between capsules that have member processes with open network connections is shown in FIG. 5B. The synchronization steps between the capsules tells them where and when to stop sending packets. At step 550, the two host networks establish communication at the kernel level. At step 555 the number and kind of packets already exchanged between the two capsules is determined and at step 560, the capsules agree when to stop sending packets. Then, at step 565 the port number of the first and second capsules is determined. The two host networks also agree on the state of the capsules just before the first capsule migrates at step 570.

Buffering Scheme During Migration

When a capsule migrates it is transparent to the user but not the underlying system. Individual applications are communicating via the open network connections. The applications communicate across the network via a socket interface. The application opens a connection by specifying the IP address and port of the target, for instance. Thereafter, it merely writes data to the socket. The device driver and system library add headers and put data into the packets, with any necessary buffering. When the target capsule migrates, the driver stops transmitting packets over the network. The application, however, may continue to write data to the socket but eventually the driver's buffers will fill up, and the driver will return an error to the application, or block until buffers are available, depending on the API used. The application may handle errors in any manner it chooses. Usually it will simply wait until the driver starts transmitting again once the target has migrated and resumed.

Figure 6:
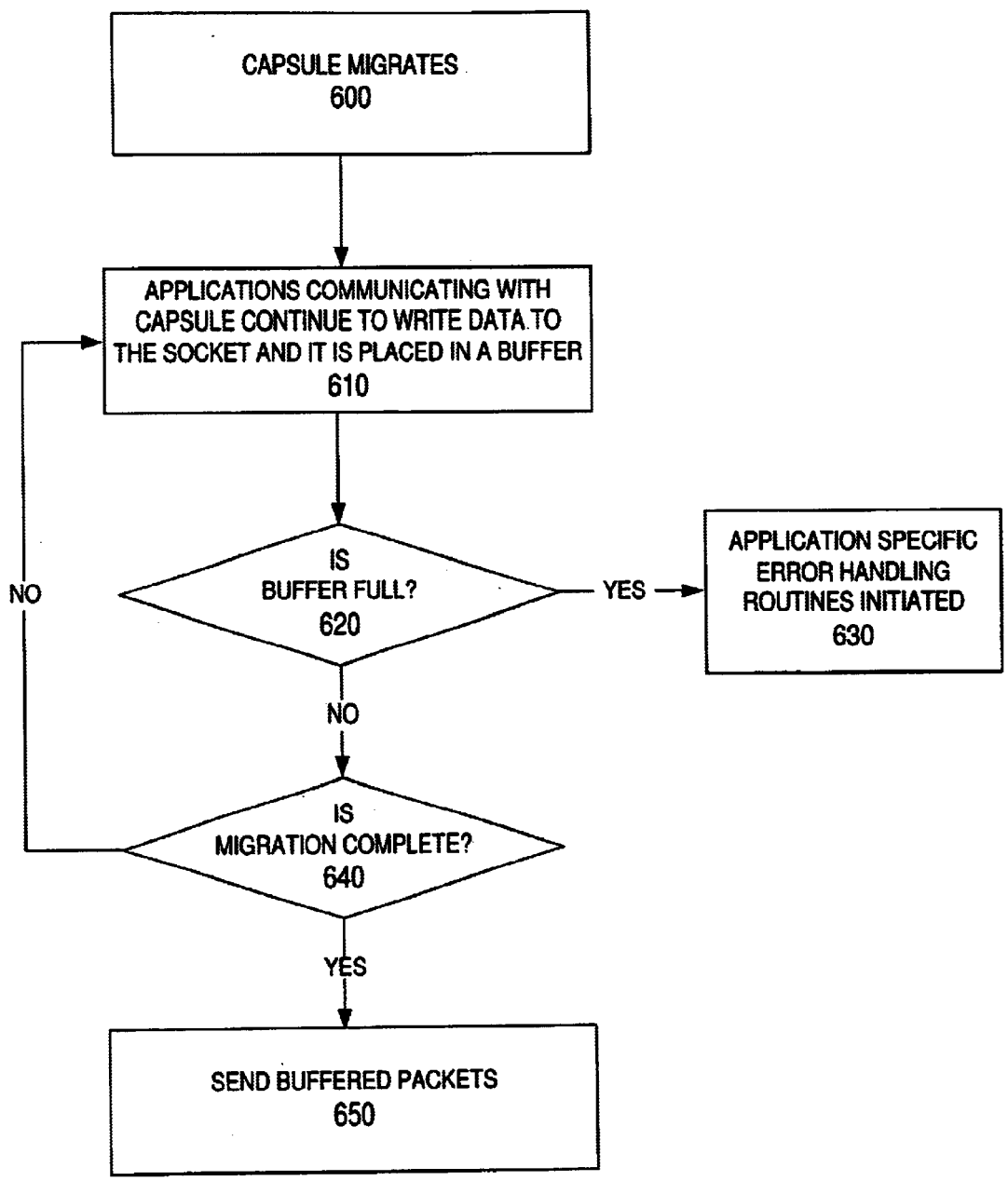
FIG. 6 shows a buffering scheme during migration according to an embodiment of the present invention.

FIG. 6 illustrates this scheme. At step 600 a capsule, which is the destination for data via one or more open network connections, migrates. At step 610, the applications communicating with the capsule continue to write data to the socket and the data is placed in a buffer but the data is not transmitted across the network. At step 620, it is determined if the buffer is full. If it is, application specific error handling routines are used at step 630. Otherwise, it is determined at step 640 whether the capsule migration is complete. If not, step 610 repeats, when migration is complete, the packets being buffered at the socket are sent to the capsule at step 650.

Communication Between Capsules

Figure 7:
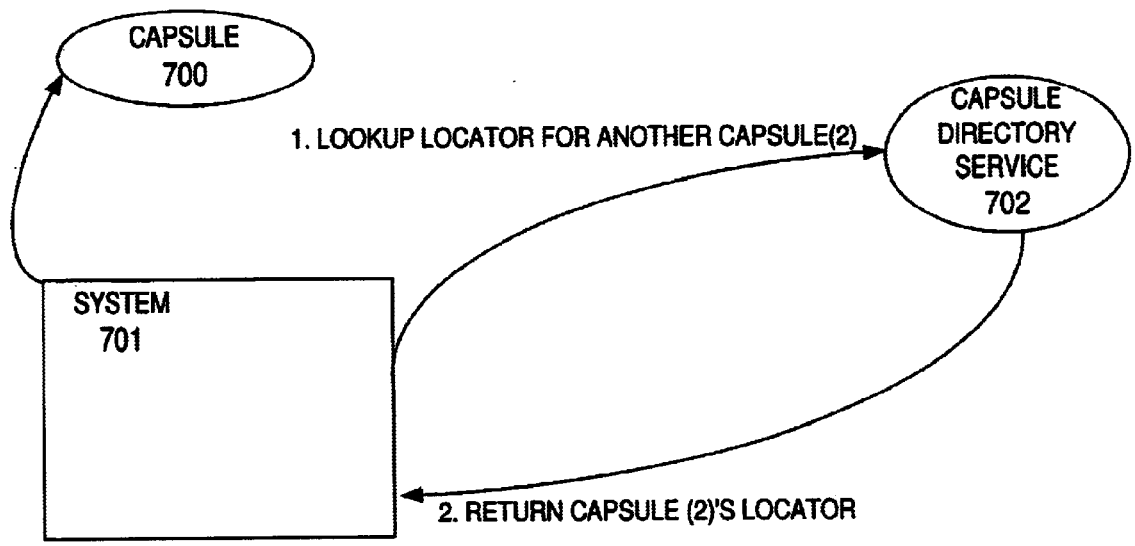
FIG. 7 shows how capsules communicate according to an embodiment of the present invention.

In order for multiple capsules to communicate via open network connections using packets each capsule must be able to determine exactly where the other capsule is. In one embodiment of the present invention, shown in FIG. 7, a directory service is used in a manner similar to how a Domain Name Service (DNS) system is used for IP addresses. Capsule 700 residing on system 701 looks up the unique locator, an IP address for instance, for another capsule (capsule (2)) in capsule directory service 702. The locator (if one exists) for the target capsule is used along with the locator for the source capsule and other pertinent information in the header of the packet when the two initiate the open network connection.

Figure 8:
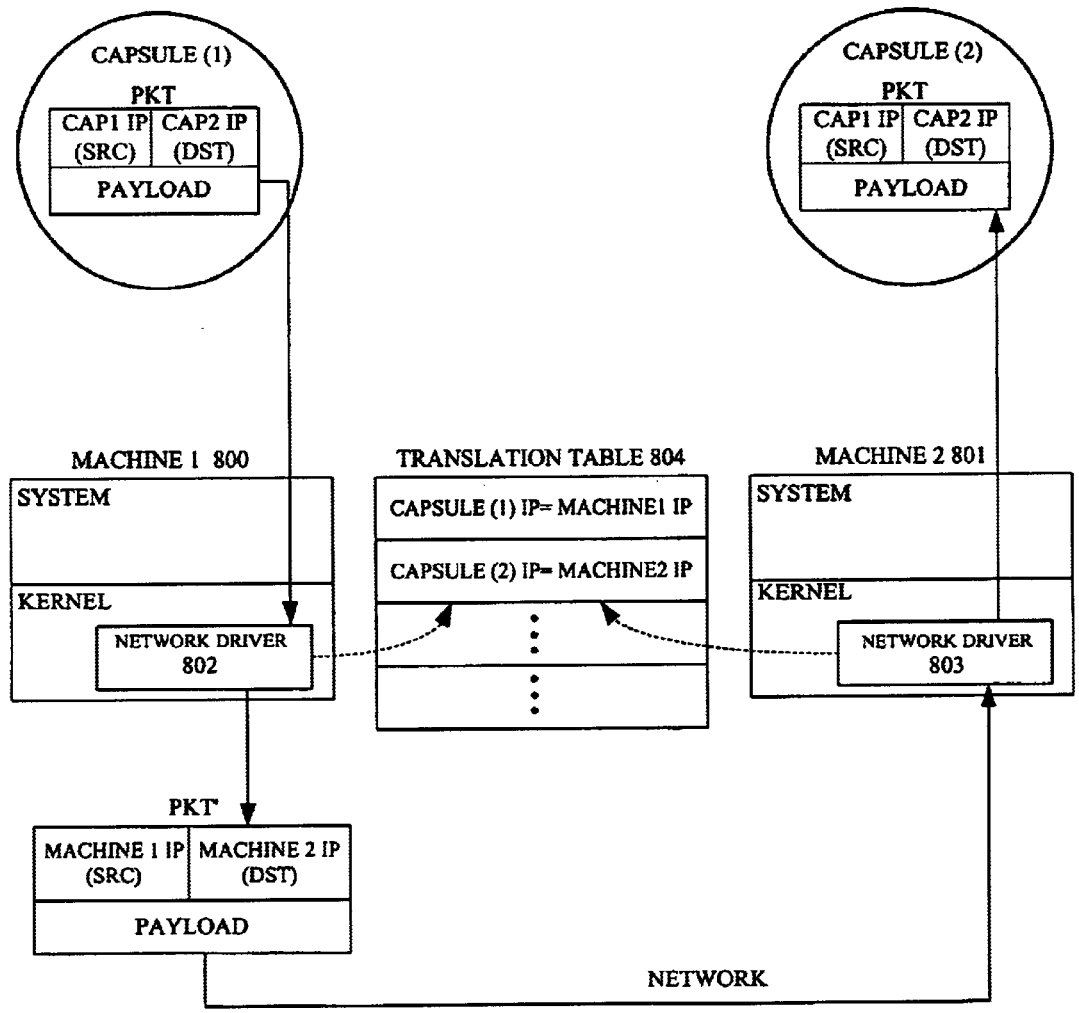
FIG. 8 shows how capsules communicate according to another embodiment of the present invention.

FIG. 8 shows how this communication is accomplished according to one embodiment of the present invention using a network with standard Internet protocols, switches, and routers. Capsule (1) resides on machine 1 (800), while capsule (2) resides on machine 2 (801). The outgoing packet (pkt) from capsule (1) has as part of its header information the IP addresses of capsules (1) and (2), along with the payload (data to be transferred). The outgoing packet is wrapped in another packet (pkt') which contains as part of its header information the network locator addresses (machine IP addresses) of machines 1 and 2. The wrapping takes place after network driver 802 has mapped (translated) the IP address of Capsule (1) to the IP address of machine 1, and the IP address of Capsule (2) to the IP address of machine 2 in a table Translation Table 804). Pkt' is sent along the network to machine 2, where network driver 803 of machine 2 checks the mapping in the table. Based on the information in the table, machine 2 removes the wrapping packet (pkt'), and sends the original packet (pkt) to its final destination (Capsule (2)) according to another embodiment of the present invention.

Special Router

Figure 9:
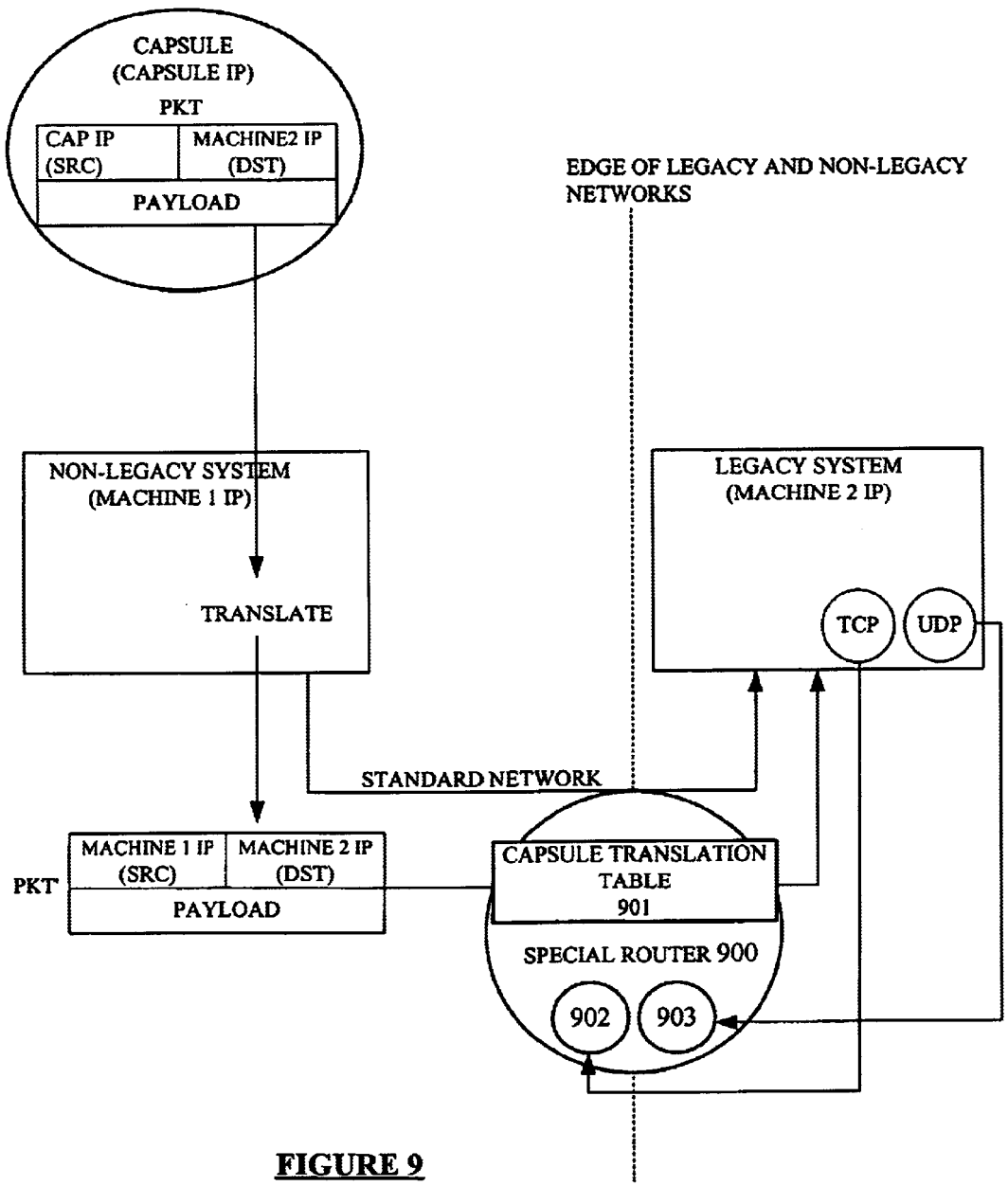
FIG. 9 is an illustration of the use of special routers according to one embodiment of the present invention.

If a user residing on a system configured for compute capsules wants to send packets to another user residing on a non-capsule system (or vice-versa), a special router is used by one embodiment of the present invention. The special router acts like a firewall and takes care of packets intended for the user. FIG. 9 shows an illustration of how packets are gracefully handled by special router 900, which has a capsule translation table 901 to map the IP address of the capsule to its machine.

The sender may decide to migrate while sending packets to another user residing on a non-capsule system. Since it is not possible to synchronize and have the network driver of the non-capsule system cease transmission, buffers 902 and 903 inside the special router take care of packets en-route, and these packets are gracefully handled depending on the kind of networks. If the network protocol is connection-oriented, such as TCP (Transmission Control Protocol), then the transmit window in buffer 902 is either set to zero and/or a "keep alive" message is sent back. If the network protocol is connectionless, such as UDP (User Datagram Protocol), then buffer 903 either drops the packets, or buffers as many as possible. The special router can also use a capsule's IP address mapping from capsule translation table 900 to perform special behavior on certain packets (for instance stop its transmission).

Embodiment of a Computer Execution Environment

Figure 10:
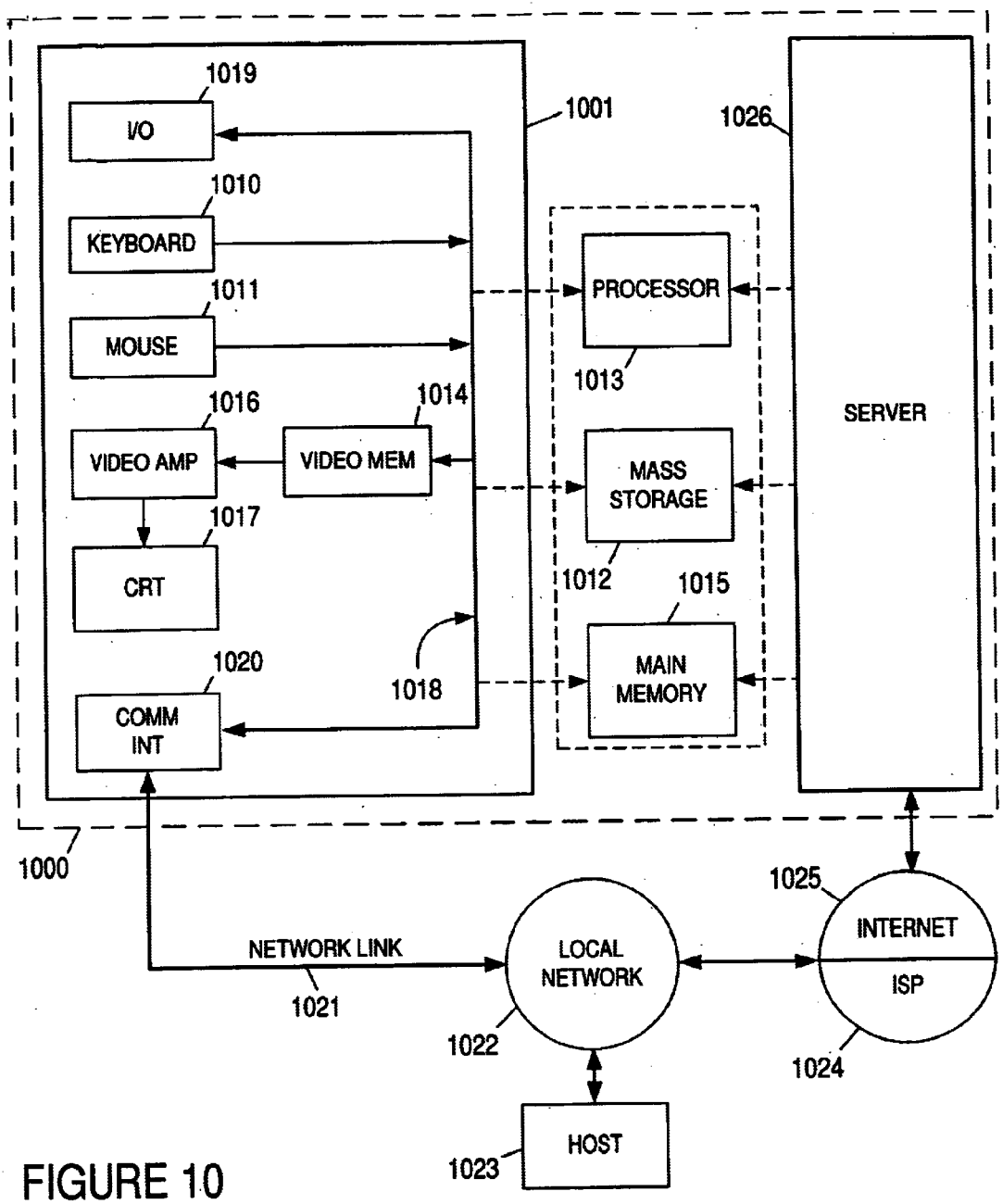
FIG. 10 is an illustration of an embodiment of a computer execution environment.

An embodiment of the invention can be implemented as computer software in the form of computer readable code executed in a desktop general purpose computing environment such as environment 1000 illustrated in FIG. 10, or in the form of bytecode class files running in such an environment. A keyboard 1010 and mouse 1011 are coupled to a bi-directional system bus 1018. The keyboard and mouse are for introducing user input to a computer 1001 and communicating that user input to processor 1013.

Computer 1001 may also include a communication interface 1020 coupled to bus 1018. Communication interface 1020 provides a two-way data communication coupling via a network link 1021 to a local network 1022. For example, if communication interface 1020 is an integrated services digital network (ISDN card or a modem, communication interface 1020 provides a data communication connection to the corresponding type of telephone line, which comprises part of network link 1021. If communication interface 1020 is a local area network (LAN) card, communication interface 1020 provides a data communication connection via network link 1021 to a compatible LAN. Wireless links are also possible. In any such implementation, communication interface 1020 sends and receives electrical, electromagnetic or optical signals, which carry digital data streams representing various types of information.

Network link 1021 typically provides data communication through one or more networks to other data devices. For example, network link 1021 may provide a connection through local network 1022 to local server computer 1023 or to data equipment operated by ISP 1024. ISP 1024 in turn provides data communication services through the world wide packet data communication network now commonly referred to as the "Internet" 1025. Local network 1022 and Internet 1025 both use electrical, electromagnetic or optical signals, which carry digital data streams. The signals through the various networks and the signals on network link 1021 and through communication interface 1020, which carry the digital data to and from computer 1000, are exemplary forms of carrier waves transporting the information.

Processor 1013 may reside wholly on client computer 1001 or wholly on server 1026 or processor 1013 may have its computational power distributed between computer 1001 and server 1026. In the case where processor 1013 resides wholly on server 1026, the results of the computations performed by processor 1013 are transmitted to computer 1001 via Internet 1025, Internet Service Provider (ISP) 1024, local network 1022 and communication interface 1020. In this way, computer 1001 is able to display the results of the computation to a user in the form of output. Other suitable input devices may be used in addition to, or in place of, the mouse 1011 and keyboard 1010. I/O (input/output) unit 1019 coupled to bi-directional system bus 1018 represents such I/O elements as a printer, A/V (audio/video) I/O, etc.

Computer 1001 includes a video memory 1014, main memory 1015 and mass storage 1012, all coupled to bi-directional system bus 1018 along with keyboard 1010, mouse 1011 and processor 1013.

As with processor 1013, in various computing environments, main memory 1015 and mass storage 1012, can reside wholly on server 1026 or computer 1001, or they may be distributed between the two. Examples of systems where processor 1013, main memory 1015, and mass storage 1012 are distributed between computer 1001 and server 1026 include the thin-client computing architecture developed by Sun Microsystems, Inc., the palm pilot computing device, Internet ready cellular phones, and other Internet computing devices.

The mass storage 1012 may include both fixed and removable media, such as magnetic, optical or magnetic optical storage systems or any other available mass storage technology. Bus 1018 may contain, for example, thirty-two address lines for addressing video memory 1014 or main memory 1015. The system bus 1018 also includes, for example, a 32-bit data bus for transferring data between and among the components, such as processor 1013, main memory 1015, video memory 1014, and mass storage 1012. Alternatively, multiplex data/address lines maybe used instead of separate data and address lines.

In one embodiment of the invention, the processor 1013 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 1015 is comprised of dynamic random access memory (DRAM). Video memory 1014 is a dual-ported video random access memory. One port of the video memory 1014 is coupled to video amplifier 1016. The video amplifier 1016 is used to drive monitor 1017. Monitor 1017 maybe a cathode ray tube (CRT) raster monitor. Video amplifier 1016 is well known in the art and may be implemented by any suitable apparatus. This circuitry converts pixel data stored in video memory 1014 to a raster signal suitable for use by monitor 1017. Monitor 1017 is a type of monitor suitable for displaying graphic images.

Computer 1001 can send messages and receive data, including program code, through the network(s), network link 1021, and communication interface 1020. In the Internet example, remote server computer 1026 might transmit a requested code for an application program through Internet 1025, ISP 1024, local network 1022 and communication interface 1020. The received code maybe executed by processor 1013 as it is received, and/or stored in mass storage 1012, or other non-volatile storage for later execution. In this manner, computer 1000 may obtain application code in the form of a carrier wave. Alternatively, remote server computer 1026 may execute applications using processor 1013, and utilize mass storage 1012, and/or video memory 1015. The results of the execution at server 1026 are then transmitted through Internet 1025, ISP 1024, local network 1022, and communication interface 1020. In this example, computer 1001 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention maybe implemented in any type of computer system or programming or processing environment.

Thus, the migration of open network connections is described in conjunction with one or more specific embodiments. The invention is defined by the following claims and their full scope of equivalents.

We claim:

1. A method for migrating an open network connection comprising:

encapsulating one or more active processes and a system environment relating to said processes into a compute capsule;

assigning said compute capsule a unique locator;

establishing one or more open network connections between said compute capsule and one or more other compute capsules;

migrating said compute capsule;

re-establishing said open network connection using said unique locator.

2. The method of claim 1 wherein said unique locator is an IP address and a network locator.

3. The method of claim 2 wherein said unique locator is stored using a directory service.

4. The method of claim 3 wherein said directory service uses LDAP or DNS.

5. The method of claim 1 wherein migrating said compute capsule is performed within a kernel.

6. The method of claim 1 wherein migrating said compute capsule is performed within specialized routers.

7. The method of claim 1 wherein re-establishing said open network connection using said unique locator is performed within a kernel.

8. The method of claim 1 wherein re-establishing said open network connection using said unique locator is performed within specialized routers.

9. A computer program product comprising, a computer usable medium having computer readable program code embodied therein configured to migrate an open network connection, said computer product comprising:

computer readable code configured to cause a computer to encapsulate one or more active processes and a system environment relating to said processes into a compute capsule;

computer readable code configured to cause a computer to assign said compute capsule a unique locator;

computer readable code configured to cause a computer to establish an open network connection between said compute capsule and one or more other compute capsules;

computer readable code configured to cause a computer to migrate said compute capsule; and computer readable code configured to cause a computer to re-establish said open network connection using said unique locator.

10. The computer program product of claim 9 wherein said unique locator is an IP address and a network locator.

11. The computer program product of claim 10 wherein said unique locator is stored using a directory service.

12. The computer program product of claim 11 wherein said directory service uses LDAP or DNS.

13. The computer program product of claim 9 wherein migrating said compute capsule is performed within a kernel.

14. The computer program product of claim 9 wherein migrating said compute capsule is performed within specialized routers.

15. The computer program product of claim 9 wherein re-establishing said open network connection using said unique locator is performed within a kernel.

16. The computer program product of claim 9 wherein re-establishing said open network connection using said unique locator is performed within specialized routers.

* * * * *